Figure 1:
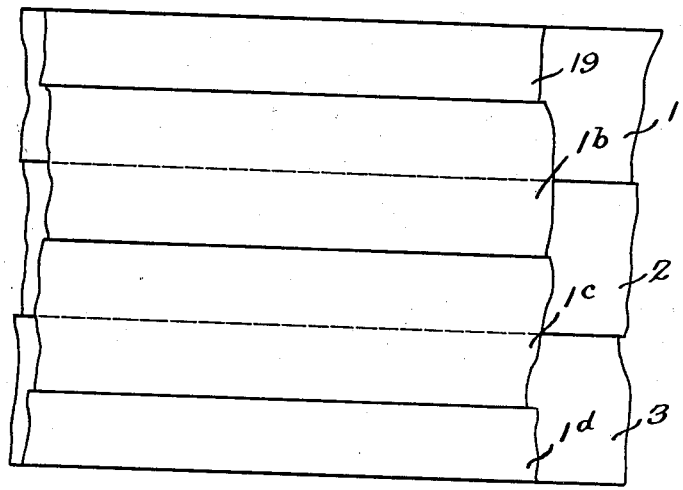

Aug. 13, 1935.                    A. LUTZ                    2,011,452
                    MANUFACTURING PAPER TUBES AND THE LIKE
                              Filed June 9, 1930

H. Lutz, INVENTOR
By: Marks & Clark
      Attys.

Patented Aug. 13, 1935

2,011,452

UNITED STATES PATENT OFFICE 2,011,452

MANUFACTURING PAPER TUBES AND THE LIKE

Alfred Lutz, Bredereiche-Uckermark, Germany

Application June 9, 1930, Serial No. 460,019
In Germany June 14, 1929

5 Claims. (Cl. 93—94)

This invention has reference to tubing and pipes made from paper, paper-tissue and the like and it is intended to improve the process of manufacture of such articles and to make provision against leakage and irregularity in the thickness of the sheets, and to obtain other important advantages and to facilitate the proces of manufacture generally. The length of tubes and pipes as heretofore obtained by the winding of webs of paper is limited by the operating width of the paper machine. However, the limited length of the paper tubing produced according to the previous art and the absence of proper means of connection between the tube sections constituted a serious drawback with relation to the general use of paper tubings in the manufacture of pipe conduits of various kinds and for different uses. In view the comparatively small length of the several tube sections made of paper such conduits required a considerably greater amount of pipe connections than ordinarily employed in the case of iron or steel tubes of standard length. This difficulty has caused considerably greater expenditures for the manufacture of pipe conduits of paper and a considerable increase in the costs of mounting such conduits and tubes in position, so that their adaptability was comparatively restricted, and for a variety of uses such conduits had to be entirely discarded. Then there was the difficulty that in view of the increased amount of pipe connections the danger of leakage was very high and the tightening of such tube and pipe connections was very difficult. Thus, as a matter of fact, pipe conduits made of paper, as heretofore manufactured, were almost excluded from general use, though the paper tubes, as compared with pipes and tubes made of metal, concrete and ceramic material or the like present a great number of important advantages, of which may for instance be mentioned their low weight, inexpensiveness, a comparatively high degree of strength notwithstanding the low weight of such tubes, their high degree of elasticity and resiliency (and in this connection may be mentioned their great safety against the blows caused by the flowing water in the tubes). Moreover, such tubes and pipes are substantially proof against variations of temperature and they present the advantage of excellent heat insulating properties, and consequently the avoidance of losses of heat and the practical prevention of freezing up of water mains, a low degree of heat capacity and consequently an easy and agreeable manipulation of suspended or floating pipe conduits at low temperatures and in addition thereto it may be mentioned that they present the important advantages of resistance against chemical action, a high degree of electric insulation and absence of any vitiation of the taste which is of importance in the case of metallic pipe conduits in breweries, dairies and the like, and a point of importance is also the low degree of conductivity of sounds.

Now, this invention is intended to devise means of manufacturing tubes and pipes from paper, the length of which is substantially only restricted by the facilities of transportation in the particular case. In accordance with the invention paper tubes may be manufactured having the same length as corresponding metal tubes and by this means the number of pipe conduits will be considerably diminished, so that by this means pipe conduits may be manufactured from paper which are not only equivalent to metal conduits but which, considering the many advantages presented by this material and heretofore enumerated, are highly superior to metal pipes and tubings.

On the accompanying drawing some embodiments of the principle of this invention are shown by way of exemplification which will serve for the explanation and understanding of the invention.

Figure 2:
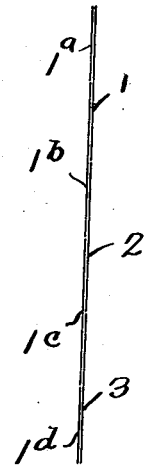

Fig. 1 shows merely by way of comparison a tube obtained in the well known manner by winding a web of paper in several adjacently disposed layers upon a mandrel and with the joints of the several layers which comprise a plurality of contiguously arranged paper webs, staggeringly disposed with relation to each other. Fig. 2 shows diagrammatically a cross sectional view through the layers of paper in accordance with Fig. 1.

Figure 3:
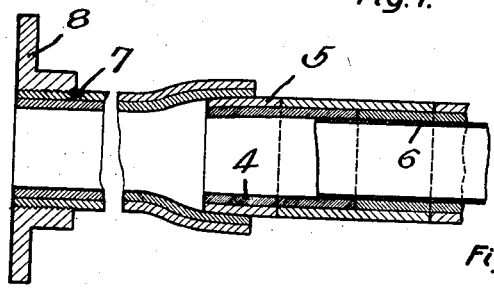
Figure 3:
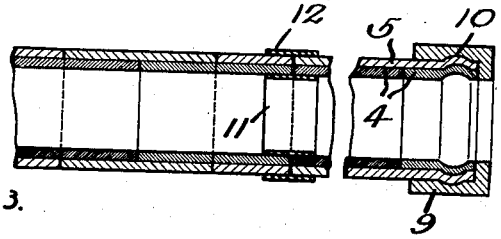
Figure 4:
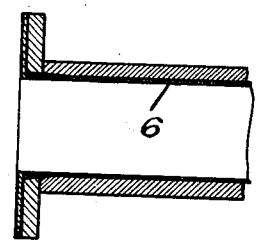

In Fig. 3 a tube obtained according to this invention is shown in longitudinal sectional view, illustrating at the same time different means of connection of sections of paper tubes. Fig. 4 is a modified form of manufacture in which the paper tubing is provided at the inside with a metallic coating layer, this coating being employed for the purpose of securing the flanges at the ends of the tube.

As appears from Fig. 1 of the drawing a plurality of adjacently disposed layers of paper comprising several webs are arranged in such a manner that the joints of the several layers are staggeringly or alternatively disposed. The lowermost layer of paper comprises for instance the paper webs 1, 2, 3, and the next layer is composed of the webs 1a, 1b, 1c, 1d. The joint between the webs 2 and 3 is situated at about the middle of the web 1c, and the joint between the webs 1 and 2 at about the middle of the web 1b and so on. Thus in order to manufacture for instance a pipe or tube of 6 meters (20 feet) five webs of paper of a width of 2 meters and two webs of 1 meter width are wound either simultaneously or successively upon a winding mandrel with the employment of a suitable adhesive. This may for instance be effected by first winding upon the mandrel the layer comprising the three webs 1, 2, 3 until a certain thickness of the wall is obtained and then winding up the other layer comprising the webs 1a, 1b, 1c, 1d; or both layers (1, 2, 3 and respectively 1a, 1b, 1c, 1d) are wound up upon the mandrel in such a manner that one of the layers is alternatingly disposed with relation to the other layer upon the periphery of the mandrel. The winding operation is preferably effected at right angles to the axis of the tube, because this manner of winding will insure the section presenting the highest degree of strength of the paper to coincide with the section of the pipe which is submitted to the highest sectional strain. In the manufacture of less strained pipes the webs may of course also be wound upon the mandrel at an angle to the axis of the pipe.

The procedure may also be such that the several webs are first wound so as to constitute individual sleeves of different diameters, the sleeves of smaller diameter being then introduced into the sleeves of larger diameter and in such a manner that the joints of the several sleeves become staggeringly arranged. A tube obtained in this manner is shown in Fig. 3 of the drawing. The inner sleeves 4 are of such size and so arranged that they may be telescoped into the outer sleeves 5. The contacting surfaces of the several tubes are preferably pasted together by means of the adhesive employed in the winding of the sleeves. By this means tubes of uniform structure and great strength and having walls of uniform thickness are obtained. With this kind of manufacture there is the advantage that the width of the machines employed may be the same as with the previous kind of manufacture. By the telescopic connection of the several sleeves any desired length of pipes may be obtained. Among the different pasting impregnating and hardening means employed the following may be mentioned as instances: animal glue, mixtures of tar with asphaltum, coal-tar pitch, adhesive varnishes, so-called wood-cement, rubber solution, synthetic resins, solutions of cellulose, sulphuric acid, chloride of zinc and other agents capable of dissolving or impregnating and swelling up cellulose or paper pulp. The highest degree of mechanical strength and the maximum of resistance against the entrance of moisture and against chemical action are obtained by the use of artificial resins, that is to say the condensation products of phenols with formaldehyde.

The union of the short sleeves produced in the usual manner into a pipe may also be effected in another manner. Thus, if it is for instance desired to manufacture a pipe conduit of vulcan-fibre one of the ends of the sleeves is expanded by being immersed into hot water while the other end is constricted by sharp drying in such a manner that it may be inserted into the expanded end. After the drying the two sleeves are inseperably connected to each other. This action is due to the following facts. The end of the outer tube which has been moistened by hot water emits moisture and then shrinks, while the other previously dried end absorbs the moisture and swells up, so that it is forced from the inside against the outer end. It is frequently sufficient to change the degree of moisture of one of the two ends which may be effected for instance by enlarging the outer end by moistening it in the case of using two pipe sections of vulcan fibre, while the inner end is forced into the outer end without being submitted to drying. A particularly tight connection of the several sections will be obtained if the diameters of the sections are so adjusted that the section to be inserted has to be forcibly introduced as for instance by means of a mandrel or the like and, if necessary after enlarging the diameter of the outer piece by means of the mandrel. In this manner a tight and inseparable connection of the sections is obtained without the use of adhesives.

A still more reliable pipe connection of the sleeves may be obtained by moistening the outer sleeve for instance with a solution of animal glue or with parchment makers' sulphuric acid, or the interior sleeve may be introduced into hot tar for the purpose of expelling the moisture before inserting it into the outer moistened section.

In Fig. 3 a pipe is shown the left end of which has been connected to another pipe in the manner just described.

Instead of enlarging one pipe end by moistening it and narrowing the other end by drying the connection may be effected by slipping a moistened sleeve or collar of paper 12 over the ends of the sleeve to be connected which may have been previously dried and then causing the outer connecting sleeve or collar to be shrunk. A similar very satisfactory tightening connection may be obtained by introducing this kind of paper collar into the sleeves to be connected, so as to constitute a nipple 11 which, when moistened places itself tightly against the interior wall of the two sleeves. The use of such collars or nipples is illustrated in Fig. 3 of the drawing. It is possible of course to use both nipples and collars for the connection.

For the purpose of mounting pipes obtained from paper sleeves in the manner described short pipe sections of steel, brass and the like and having flanges, threads or coupling means and preferably clutch coupling may be employed, the smooth pipe sections being slipped onto the previously dried ends of the paper pipes. This may preferably be effected by expanding the metal pipe sections by heat and then slipping them over the ends of the paper pipes. The diameters of the paper pipes are so adjusted that the heated metal pipe section will barely allow of being slipped onto the ends. The several paper pipes may also be connected by providing the ends with threads by pressure or by cutting the threads into the walls, so that the ends may be screw-connected after having been moistened and respectively dried. This is also indicated in Fig. 3. The connection may moreover be effected by riveting or by producing annular grooves and the like by a rolling process. This kind of pipe connection may be employed both for the connection of the several sleeves into a pipe as well as for connecting the pipes obtained into a larger pipe conduit.

In the case of pipes made from materials which are only slightly enlarged by the action of moisture or which are not enlarged at all, such as pipes and tubes made from asphaltum paper, bakelite, celluloid, aluminium, steel, concrete and the like, the connection is effected by either slipping a moistened sleeve of paper like a collar over the pipe ends to be connected or by introducing a sharply dried tube of paper in form of a nipple into the pipe ends. It is possible of course to use both nipple and collar simultaneously as heretofore mentioned. The collar-like section is shrunk onto the pipe ends by the evaporation of the moisture while the nipple becomes enlarged by the absorption of moisture and is tightly pressed against the inside wall of the pipe. The engagement of the nipple from the interior is assisted by the pressure prevailing in the conduit. This double kind of tightening will resist both overpressure acting from the interior as well as overpressure acting from without. In the case of using paper and metal the stretching of the metal may be utilized by slipping for instance a heated piece of aluminium pipe onto a previously dried pipe of vulcan fibre and in such a manner upon the cooling of the aluminium and by the action of the absorption of water of the vulcan fibre both pipes become tightly connected to each other. On the other hand, if the metal is used as a lining or interior coating for the pipe it is cooled before being inserted into the moistened paper pipe. As soon as with the methods of manufacture hereinbefore indicated the most favorable rate of moisture of the paper has been obtained, this condition is utilized by protecting the exteriorly disposed pipe sections which had become shrunk onto the interior pipe by the discharge of moisture, against the absorption of new amounts of water by suitable means. This may for instance be effected by coatings of varnish, tar, asphaltum or by mounting rings of metal upon the particular sections or by winding tarred jute, sisal or the like onto them.

In those cases in which the pipes are required to possess particular high degrees of resistancy against high pressure steam, concentrated or hot acids, alkalis and other liquors, or in case the odor of the hardened paper is objectionable, very thin linings of suitable material are applied to the inside wall. In case it is for instance required to manufacture pipe conduits intended for the passing of concentrated hot sulphuric acid under pressure the inside wall of the paper tube or pipe is coated with a very thin lining of lead. Pipes of this kind present a number of advantages, as follows:

1. The lead lining may be very thin, because the interior overpressure is absorbed by the layer of paper, so that a thickness of ½ to 1 millimeter of lining is sufficient. This results in a very considerable saving of lead.

2. The lead lining protects the paper pipe against moisture and against chemical action.

3. The solid, substantially stiff and elastic wound layer of paper protects the lead lining from bending, deformation and against overpressure from without.

4. The paper wall protects the hot acids against cooling.

5. Onto the ends of the lead lining projecting from the paper tubes flanges are slipped and then the lead lining is turned outside or beaded at its ends. The turned-over edge of the lead lining serves at the same time as tightening means for the flanges, as shown in Fig. 4.

Whenever a high degree of strength and resistance against interior overpressure and an absolute protection of the wall of the paper pipe against the action of water under pressure are to be accompanied with low weight of the material of the pipe, an inner lining of sheet metal, such as for instance aluminium sheet, tin foil or lead foil, celluloid and the like, may be employed. In case it is desired to protect the paper pipe or tube against the entrance of moisture from without, the pipe is also protected from the outside by being coated with metal foil in addition to which intermediate layers of metal foil may be employed. The union of the metal foil with the paper may be preferably effected by means of an adhesive insoluble in water such as bakelite, asphaltum, solution of cellulose and the like or by means of tarred jute, sisal or the like, these materials being wound around the tube and being particularly adapted to protect it from injuries occurring in the utilization of the tubes or pipes. Inasmuch as the manufacture of hardened paper by heating under pressure is somewhat complicated, a single layer of tar and asphaltum—impregnated paper will be sufficient in many cases particularly for instance for ground-conduits, in which case the interior covering may likewise be manufactured from metal foil or a tubing of several layers composed of acid-parchment, paper tissue, celluloid, celluloid film, vulcan fibre, sheet copper, sheet zinc, steel sheet, wooden veneers, glass, porcelain and the like. Glass and porcelain are particularly employed in the case of pipes for wine, milk, beer, mineral waters and the like, which are likely to take up some undesirable taste or odor from metal pipes or from hardened paper. A lining of glass is particularly adapted in case the friction in the pipe should be kept as low as possible in spite of narrow cross section and high velocity, as for instance in the case of the jet throwing pipes of the fire departments or in the case of long jets ejecting raining means for sprinklers. The stiff and nevertheless elastic paper winding insures an absolutely reliable protection against thrusts and blows, so as to admit of the use of brittle or fragile substances such as glass, porcelain and the like.

In Fig. 3 of the drawing the inner coating of a paper tube with the inserting layer made from one of the kinds of material above mentioned is shown. In this figure the interior coating is applied to a pipe or tube comprising the inner and outer sleeves 4 and 5 it is evident however that, as already mentioned, this kind of interior coating may also be employed for such tubes or pipes which are manufactured by the shrinkage of the several sleeves constituting the pipe.

In order to incorporate a maximum of impregnating and adhesive agents with the paper tube corrugated, creped, twisted or similarly treated paper or paper tissue may be employed. This kind of paper will closely surround or hug the mandrel, when being wound around and compressed upon it, and without the formation of plaits or folds, and it imparts an increased amount of strength to the wall of the tube, so that this kind of tubes will possess a very high degree of resistibility against blows from the movement of the water.

The manufacture of the tubes or pipes in the manner described as for instance by the employment of tube sections of readily hardened paper, sheet metal and the like which are slipped upon the mandrel and which are united to the layers of paper which are then wound upon the sections presents the important advantage that the finished wound tubes may be easily drawn off from the mandrel, and there is the additional important feature that the tubes or pipes, while still in the soft condition, may be very easily manipulated for further treatment and such pipes may be adapted to a great variety of uses in view of the possibility of correspondingly manufacturing the inside wall of the tube by a selection of suitable material. The layers of paper which comprise convolutions of webs of material constitute, so to speak, a single tightly secured bandage or tyre around the several pipe sections which serve as the interior wall, and by this means the entire structure is made to constitute a highly resisting strong pipe the length of which may be adapted to various requirements.

For the purpose of providing pipe connections and as a protection for the ends of the tubes or pipes these are provided with ring shaped caps of metal or of other material. These caps in another exemplification may be seated in the walls of the tubes themselves by being surrounded by the convolutions and they may be shaped, so as to constitute coupling members and may be provided with threads, in order to be adapted for the application of flanges, collars and the like which are slipped onto these ends. In case the use of metal has to be completely avoided, the threads may be cut into the wall of the paper tube, provided hardened paper is used or they may be formed thereon by impression. The left hand end of the pipe section 7 according to Fig. 3 is provided with exterior threads and upon these threads a flange 8 is screw-threadedly secured. Obviously the entire pipe section 7 may also be provided with threads, in which case the coupling member constituted by the flange will be correspondingly shaped. In order to produce a very reliable connection between the tubes and the caps contained in the walls thereof, the caps may be provided with annular or threadlike depressions into which the material of the pipe is forced before or during the hardening process. In this case it is preferable to mount the caps in the heated condition and then the paper wall is heated and is rolled from the inside and forced into the depressions of the cap. This kind of cap and the mounting thereof are shown at the right hand end of the tube represented in Fig. 3 of the drawing. In this embodiment the cap 9 is made of brass and is provided at its inside wall with a groove 10 into which the material of the sleeves 4, 5 is forced by rolling. Instead of a groove 10 the cap 9 may also be provided with interior threads and may be screwed onto the pipe. Upon the outside of the cap 9 exterior threads may be provided for the mounting of flanges and the like.

A simple and reliable pipe connection may be obtained by shaping and arranging the ends of the pipe, when the walls are wound, so that the ends of the pipe may be telescopingly inserted into each other. They are thereby also tightly connected and may be united by means of adhesive and preferably by the adhesive employed in the winding of the tubes. The exterior joint may be protected by a kind of collar obtained by winding impregnated paper around it. In most cases this kind of collarlike outer covering produces already a sufficient degree of tightness and strength when applied to the abutting pipe ends. By this manner of connection of the pipes it becomes possible to subsequently secure branch pipes to the conduits.

In order to obtain the necessary tightness and close engagement of the parts a pressure upon the several layers which are wound upon each other may be produced during the winding operation by means of a pressing roller forced against the winding mandrel. In addition thereto or as a substitute for the layers of paper it is possible to employ paper which is impregnated with artificial resin and to apply it to a mandrel the diameter of which is adjustable in the well known manner. The entire structure is then introduced into a strong pipe mould the inner diameter of which corresponds to the outer diameter of the pipe to be manufactured. Thereupon the mandrel is spread in the well known manner, or it is forced against the inside wall of the pipe and hardened, preferably by the aid of hot oil, asphaltum, tar or the like, or the still elastic paper may be heated and projected against the walls of the mould. In order to insure the necessary elasticity and expansion of the pipe wall, and to prevent tearing of the paper, it is preferable with this modified method of manufacture to employ particularly expansible kinds of paper, such as crepe paper, corrugated paper, paper tissue, paper yarn and the like. The manner of condensation and hardening of the layers of paper hereinbefore described may of course also be employed for such tubes and pipes in which the different webs, as mentioned above, may first be wound into sleeves separately and may then be combined to form a smooth pipe with alternatingly arranged joints by being telescopingly inserted into each other.

The pipes comprising two or a plurality of wound layers possess a higher degree of resistance and strength against interior overpressure, as compared with the singly wound pipes, because the exterior wall of the pipe absorbs the tensional strain while the inner wall of the pipe compensates the compressing strain. This is a point of important advantage in the case of interior overpressure acting upon the pipe or tube, inasmuch as the stresses occurring therein and acting upon the pipe wall are uniformly distributed in this case over the entire cross-sectional area.

If it is desired to assemble short sections of pipe consisting for instance of concrete, bakelite or asphaltum paper, so as to form pipes of some length, the pipe sections are for instance slipped onto a sharply dried and sufficiently long tube of parchment paper, the end of which projects beyond the ends of the telescopingly engaging pipe sections for a sufficient extent, to allow of these projecting ends of the tube or parchment paper to be utilized in the manner above described for connecting the several tubes or tube sections into a pipe conduit. Another combination may comprise a moistened tube of vulcan fibre with dried lining of wood. After the moisture has become distributed and compensated an extremely strong pipe of light weight is obtained.

By means of the pipe connections hereinbefore described paper tubes and pipes may be used for sprinkling plants for fire extinguishers and for similar purposes.

As compared for instance with aluminium pipes the paper pipes and tubes according to this invention present the important advantage that the weight is reduced to less than a third and the price to about half of that of aluminium pipes. Besides, the low weight and the reduced price of such paper pipes or tubes admit of increasing the inside diameter of the tubes or pipes over that of the usual metal pipes, so as to considerably reduce the friction in the pipes and without interfering with the easy manipulation of the paper pipes or the low costs of manufacture. With the use of such pipes there is also an economy in power inasmuch as a correspondingly weaker source of power is sufficient, and a smaller pumping motor may be employed, thereby resulting in an economy in running expenses for current and fuel. The main conduits made from such pipes and laid underground present the advantage over conduits made of cast iron and concrete that they are not only cheaper and of lighter weight, but are also not attacked by rust, humic acid, water containing carbonic acid, strolling currents and the like. As already stated, the structural length of the pipe conduits is only limited by the transporting requirements. Hence there is an economy in time and wages, in the mounting of the sprinkler pipes and the mounting itself is much simplified on account of the light weight. Also as regards coefficient of expansion, transmission of heat, strength, elasticity and as regards other qualities the paper pipes are very considerably superior to metal pipes particularly when employed for sprinkling arrangements, fire extinguishers and the like. On account of the low weight and the reduced cost of the paper pipes they are very well suited for the so-called pipe-rinsing or sprinkling plants for agricultural purposes, and particularly in connection with the utilization of the refuse and sewage from large cities. For this purpose it is frequently sufficient to telescopingly insert the pipes into each other by conically enlarging them at one end or providing them with a kind of collar consisting of wound up paper or with a ring of sheet metal which is applied in the hot condition.

The invention is not restricted to the particular embodiments herein described merely by way of exemplification and illustration, and it is susceptible of other forms and embodiments and modifications except as otherwise appears from the appended claims.

I claim:—

1. The method of manufacturing paper- and fiber tubes and the like, which comprises telescopically applying a tubular paper structure and a tubular coating structure of different degrees of temperature and moisture engagingly into each other, drying and reducing the temperatures of said structures, and shrinkingly engaging the same.

2. The method of manufacturing paper- and fiber tubes and the like, which comprises bending and winding webs of paper and similar material into tubular structures, heating and moistening sections of one of such structures, and sharply drying another complemental similar structure, and telescopically introducing said structure into one another, and engagingly connecting the structures by shrinkage.

3. The method of manufacturing paper- and fiber tubular structures and the like, which comprises shaping webs of paper and of similar material into tubular structures of substantially equal diameters, expanding one of said structures by moistening, introducing therein the other structure and heating the expanded structure so as to shrink in contact with the unexpanded structure.

4. As new articles of manufacture tubes and pipes of paper and the like, comprising a plurality of engagingly disposed tubular structures of paper and of similar material, and annular, substantially cap-shaped connecting and coupling means being secured to and embedded into each other.

5. The method of union of short tube-like sleeves of paper, fiber and the like, comprising changing the diameter of the ends of the short sleeves to be telescopically engaged by the action of moisture and temperature, said ends after having been telescopically engaged will be pressed onto each other by shrinking.

ALFRED LUTZ.